United States Patent
Aida et al.

(10) Patent No.: US 7,361,717 B2
(45) Date of Patent: Apr. 22, 2008

(54) FLUOROCOPOLYMER FILM AND ITS APPLICATION

(75) Inventors: Shigeru Aida, Ichihara (JP); Masaru Yamauchi, Ichihara (JP); Hiroshi Aruga, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 47 days.

(21) Appl. No.: 11/167,304

(22) Filed: Jun. 28, 2005

(65) Prior Publication Data

US 2005/0288465 A1    Dec. 29, 2005

(30) Foreign Application Priority Data

Jun. 29, 2004    (JP)    .............................. 2004-191260

(51) Int. Cl.
*C08F 16/24*    (2006.01)
(52) U.S. Cl. ...................... 526/247; 526/242; 526/250; 526/348.1
(58) Field of Classification Search ................ 526/247, 526/242, 250, 348.1
See application file for complete search history.

(56) References Cited

U.S. PATENT DOCUMENTS

| | | | |
|---|---|---|---|
| 4,381,387 A * | 4/1983 | Sulzbach | ................. 526/247 |
| 6,197,904 B1 * | 3/2001 | Gangal et al. | ............... 526/247 |
| 2002/0128412 A1 | 9/2002 | Kitahara et al. | |
| 2005/0288465 A1 | 12/2005 | Aida et al. | |
| 2006/0205903 A1 * | 9/2006 | Aida et al. | ................. 526/247 |

FOREIGN PATENT DOCUMENTS

| | | | |
|---|---|---|---|
| EP | 43948 A1 * | 6/1981 | |
| EP | 0 927 729 A1 | 7/1999 | |
| EP | 0 992 518 A1 | 4/2000 | |
| JP | 57-38807 | 3/1982 | |
| JP | 63-222852 | 9/1988 | |
| JP | 3-188132 | 8/1991 | |

OTHER PUBLICATIONS

U.S. Appl. No. 11/430,054, filed May 9, 2006, Aida, et al.
Stephen Tanno, et al., "ETFE Foil Cushions as an Alternative to Glass for Atriums and Rooflights", International Conference on Building Envelope Systems and Technology 2$^{nd}$, 1997, pp. 1-5 and 357-361.
"AIJ Recommenations for Loads on Buildings", Architectural Institute of Japan, p. 483, Jun. 20, 1993.

* cited by examiner

*Primary Examiner*—Peter D. Mulcahy
*Assistant Examiner*—Henry S. Hu
(74) *Attorney, Agent, or Firm*—Oblon, Spivak, McClelland, Maier & Neustadt, P.C.

(57) ABSTRACT

A fluorocopolymer film formed by molding at a molding temperature of at most 320° C. a fluorocopolymer comprising repeating units based on ethylene, repeating units based on tetrafluoroethylene, repeating units based on hexafluoropropylene and repeating units based on a fluoroalkyl vinyl ether represented by $CF_2=CFOR^f$ (wherein $R^f$ represents a $C_{1-10}$ fluoroalkyl group), having a molar ratio of the repeating units based on ethylene/the repeating units based on tetrafluoroethylene of from 10/90 to 60/40, a content of the repeating units based on hexafluoropropylene to the total repeating units of from 0.1 to 20 mol % and a content of the fluoroalkyl vinyl ether to the total repeating units of from 0.1 to 10 mol %, and having a volumetric flow rate of from 0.1 to 30 mm$^3$/sec at 297° C.

12 Claims, No Drawings

FLUOROCOPOLYMER FILM AND ITS APPLICATION

The present invention relates to a fluorocopolymer film excellent in outer appearance and its application.

A fluororesin film and a film made of a fluororesin composite are light in weight and excellent in weather resistance, mechanical strength, etc. and therefore used as a covering material for e.g. a swimming pool, a gymnasium, a tennis court, a football ground, a warehouse, a hall, an exhibition hall, a horticultural greenhouse or an agricultural greenhouse (for example, JP-A-3-188132, JP-A-63-222852). However, a film made of a composite of glass fibers and a fluororesin as disclosed in JP-A-63-222852 is insufficient in transparency. Accordingly, if the film is used as a covering material for the roof of a structure, the sunbeam transmittance of the roof tends to be low. Thus, plants in the interior of the structure will not sufficiently grow. Accordingly, the above film made of the composite can not be applicable as a covering material for a structure such as horticultural facilities or sports facilities in which grass grows. Further, the interior of an architectural structure will be insufficient in wide open feeling. Here, an architectural structure wherein a film material such as a film is used for the roof or the outer wall will be referred to as a film structure. Further, a film which is fixed to a framework of e.g. iron or wood to form the roof or the outer wall portion of a structure will be referred to as a film for a film structure.

An ethylene/tetrafluoroethylene copolymer (hereinafter referred to as ETFE) film is excellent in the sunbeam transmittance. Accordingly, an ETFE film is suitably used as a film for a film structure such as an agricultural greenhouse, a horticultural greenhouse, sport facilities in which grass grows and an exhibition hall. At least two films for a film structure overlaid one on another are sandwiched between an iron frame to form a panel. Then, air is put between the films of the panel. It has been proposed that the panel is blown up to obtain the roof (International Conference on Building Envelope Systems and Technology 2nd., S. Tanno et al., 1997). Such a film for a film structure is required to have mechanical strength such as tensile strength and tear strength as well as weather resistance and transparency. Further, the film for a film structure is exposed to direct sunlight in summer (Architectural Institute of Japan, AIJ Recommendations for Loads on Buildings). Accordingly, the film for a film structure is required to maintain excellent mechanical strength even at a high temperature of about 60° C.

As an ETFE excellent in mechanical strength, a quaterpolymer ETFE obtained by copolymerization of from 40 to 60 mol % of ethylene, from 30 to 55 mol % of tetrafluoroethylene (hereinafter referred to as TFE), from 1.5 to 10 mol % of hexafluoropropylene (hereinafter referred to as HFP) and from 0.05 to 2.5 mol % of a comonomer as a fourth component has been proposed. The quaterpolymer ETFE is excellent in mechanical strength as compared with a terpolymer ETFE having no fourth component comonomer copolymerized (JP-A-57-38807).

However, such a quaterpolymer ETFE has low thermal stability as compared with a perfluoro fluorocopolymer such as a tetrafluoroethylene/hexafluoropropylene copolymer. When the quaterpolymer ETFE is molded into a film, the film may have a drawback called fisheyes in some cases. The fisheyes impair the outer appearance of the film. Further, the fisheyes may cause breakage of the film.

Under these circumstances, it is an object of the present invention to provide a fluorocopolymer film excellent in transparency, having a small number of fisheyes, excellent in outer appearance and excellent in mechanical strength, which has been required to be developed.

The present invention provides a fluorocopolymer film formed by molding at a molding temperature of at most 320° C. a fluorocopolymer comprising repeating units based on ethylene, repeating units based on TFE, repeating units based on HFP and repeating units based on a fluoroalkyl vinyl ether represented by $CF_2=CFOR^f$ (wherein $R^f$ represents a $C_{1-10}$ fluoroalkyl group), having a molar ratio of the repeating units based on ethylene/the repeating units based on TFE of from 10/90 to 60/40, a content of the repeating units based on HFP to the total repeating units of from 0.1 to 20 mol % and a content of the fluoroalkyl vinyl ether to the total repeating units of from 0.1 to 10 mol %, and having a volumetric flow rate of from 0.1 to 30 mm$^3$/sec at 297° C.

The present invention further provides a film for an agricultural greenhouse and a film for a film structure, comprising the fluorocopolymer film.

The fluorocopolymer film of the present invention has a small number of fisheyes and is excellent in transparency and outer appearance. Further, it is also excellent in mechanical strength such as tear strength or tensile strength.

Now, the present invention will be described in detail with reference to the preferred embodiments.

The fluorocopolymer in the present invention comprises repeating units based on ethylene, repeating units based on TFE, repeating units based on HFP and repeating units based on a fluoroalkyl vinyl ether represented by $CF_2=CFOR^f$ (wherein $R^f$ represents a $C_{1-10}$ fluoroalkyl group). Further, the molar ratio of the repeating units based on ethylene/the repeating units based on TFE is from 10/90 to 60/40. The molar ratio is preferably from 35/65 to 50/50, more preferably from 45/55 to 50/50. When the molar ratio is within this range, the fluorocopolymer film will be excellent in heat resistance, chemical resistance and weather resistance.

The content of the repeating units based on HFP is from 0.1 to 20 mol % based on the total repeating units. The content is preferably from 0.2 to 15 mol %, more preferably from 0.3 to 1.5 mol %. If the content is lower than this range, the mechanical strength particularly the Elmendorf tear strength tends to be low, and if it is higher than this range, the heat resistance and the mechanical strength tend to be low. When the content is within this range, the fluorocopolymer film will be excellent in mechanical strength and heat resistance.

The content of the fluoroalkyl vinyl ether (hereinafter referred to as FAV) represented by $CF_2=CFOR^f$ (wherein $R^f$ represents a $C_{1-10}$ fluoroalkyl group) is from 0.1 to 10 mol % based on the total repeating units. The content is preferably from 0.2 to 5 mol %, more preferably from 0.3 to 1.5 mol %, most preferably from 0.4 to 1.0. If the content of the repeating units based on FAV is lower than this range, the transparency tends to be low, and if it is higher than this range, the heat resistance and the mechanical strength tend to be low. When the content is within this range, the fluorocopolymer film will be excellent in transparency, mechanical strength and heat resistance.

$R^f$ in $CF_2=CFOR^f$ may have any one of straight chain, branched and cyclic structures, and may contain an etheric oxygen atom. $R^f$ preferably has a straight chain structure. $R^f$ has one to ten, preferably one to seven, more preferably two to five carbon atoms. $R^f$ is preferably a polyfluoroalkyl group, more preferably a perfluoroalkyl group. Namely, FAV is more preferably a perfluoro(alkyl vinyl ether). Specifically, FAV may, for example, be $CF_2=CFOCF_3$, $CF_2=CFO(CF_2)_2F$ (hereinafter referred to as PEVE), $CF_2=CFO(C$ $F_2)_3F$ (hereinafter referred to as PPVE), $CF_2\!=\!CFO(CF_2)_4F$ (hereinafter referred to as PBVE), $CF_2\!=\!CFOCF_2CF(CF_3)_2$, $CF_2\!=\!CFO(CF_2)_6F$ or $CF_2\!=\!CFOCF_2CF(CF_3)O(CF_2)_3F$. FAV is more preferably PEVE, PPVE or PBVE, most preferably PPVE.

The volumetric flow rate of the fluorocopolymer in the present invention at 297° C. is from 0.1 to 30 mm³/sec. The volumetric flow rate is preferably from 1.0 to 20 mm³/sec, more preferably from 5.0 to 15 mm³/sec. If the volumetric flow rate is lower than this range, melt fracture is likely to occur, whereby the outer appearance will be remarkably impaired. Further, the load at the time of extrusion tends to increase, whereby the productivity tends to be low. If the volumetric flow rate is higher than this range, the viscosity of the fluorocopolymer molten at the time of molding tends to be low, whereby it tends to be difficult to wind the fluorocopolymer as a film.

The method for producing the fluorocopolymer in the present invention may, for example, be suspension polymerization, solution polymerization, emulsion polymerization or bulk polymerization. Particularly preferred is radical polymerization, and more preferred is solution polymerization wherein ethylene, TFE, HFP and FAV are copolymerized in the presence of a radical polymerization initiator, a chain transfer agent and a polymerization medium.

The radical polymerization initiator is preferably an initiator of which the temperature at which the half life is 10 hours is from 0 to 100° C., more preferably from 20 to 90° C. Specifically, it may, for example, be an azo compound such as azobisisobutyronitrile, a peroxydicarbonate such as diisopropyl peroxydicarbonate, a peroxyester such as tert-butyl peroxypivalate, tert-butyl peroxyisobutyrate or tert-butyl peroxyacetate, a diacyl peroxide such as isobutyryl peroxide, octanoyl peroxide, benzoyl peroxide or lauroyl peroxide, a fluorinated diacyl peroxide such as $(Z(CF_2)_pCOO)_2$ (wherein Z is a hydrogen atom, a fluorine atom or a chlorine atom, and p is an integer of from 1 to 10), or an inorganic peroxide such as potassium persulfate, sodium persulfate or ammonium persulfate.

The polymerization medium may, for example, be an organic solvent such as a fluorocarbon, a chlorocarbon, a fluorochlorocarbon, a fluoroether, an alcohol or an ether, or an aqueous medium. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. The polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours, more preferably from 2 to 10 hours.

The fluorocopolymer film of the present invention is formed by molding at a molding temperature of at most 320° C. Usually, it is preferred that the fluorocopolymer is melted in an extruder to form pellets, from which a film is molded. When the film is molded, the fluorocopolymer is preferably preliminarily pelletized. At the time of molding, the pelletized fluorocopolymer can be smoothly supplied. Further, formation of bubbles in the film can be suppressed. The temperature at which the fluorocopolymer is formed into pellets is preferably at most 320° C., more preferably from 280 to 315° C., most preferably from 301 to 315° C. As the method of molding the film, the following method may be preferably mentioned. Pellets of the fluorocopolymer are melted in an extruder and discharged from a T-die. The film discharged from the T-die and molded is wound by a roll. As the extrusion conditions, the temperatures of a screw and the T-die (hereinafter both will be sometimes put together and referred to as a molding temperature) are at most 320° C., more preferably from 280 to 315° C., most preferably from 305 to 315° C. When the molding temperature is within this range, the film tends to have a small number of fisheyes. The extruder is preferably a single-screw or twin-screw extruder.

With respect to the size and the number of fisheyes contained in the fluorocopolymer film of the present invention, it is preferred that the number of fisheyes with sizes of at least 0.05 mm² and less than 0.1 mm² is at most 50 per m² and the number of fisheyes with sizes of at least 0.1 mm² is at most 15 per m². It is more preferred that the number of fisheyes with sizes of at least 0.05 mm² and less than 0.1 mm² is at most 30 per m² and the number of fisheyes with sizes of at least 0.1 mm² is at most 10 per m². When the size and the number of fisheyes are within this ranges, the fluorocopolymer film will be excellent in outer appearance, excellent in transparency and excellent in mechanical strength.

The fluorocopolymer film of the present invention has an Elmendorf tear strength of preferably at least 70N, more preferably at least 75N. The higher the Elmendorf tear strength of the film, the better. Usually, the Elmendorf tear strength of the film is at most 100N. Further, the tensile strength of the film is preferably at least 50 MPa, more preferably at least 55 MPa, most preferably at least 60 MPa. The higher the tensile strength of the film, the better. Usually, the tensile strength of the film is at most 100 MPa. When the Elmendorf tear strength and the tensile strength are within this ranges, the fluorocopolymer film is less likely to be torn or broken even when the following external force is applied thereto. Examples of the external force include an external force due to collision of a flying object, an external force due to strong wind and an external force due to snow fallen on the film. Further, the film has a haze of preferably at most 15%, more preferably at most 10%, most preferably at most 8%. The lower the haze of the film, the better. Usually the film has a haze of at least 0.5%. When the haze is within this range, the film will be excellent in transparency. Thus, the growth of plants in an agricultural greenhouse or in a film structure using this film will not be inhibited. Further, a wide open peeling as if a person is outside can be produced.

The reason why the fluorocopolymer film of the present invention has a remarkably small number of fisheyes is not necessarily clear but is considered to be such that the fluorocopolymer pyrolyzed at the time of molding is contained in the film as a residue, and the residue contained in the film causes fisheyes. Accordingly, in order to reduce the fisheyes, it is important that the fluorocopolymer in the present invention is molded at a temperature at which it is not pyrolyzed. It was found that the molding temperature of the fluorocopolymer is properly at most 320° C. The temperature is more preferably within a range of from 280 to 315° C., more preferably within a range of from 305 to 310° C. Accordingly, it is considered that a film having a small number of fisheyes and excellent in outer appearance can be obtained by molding the fluorocopolymer within the above temperature range.

Now, the present invention will be explained in further detail with reference to Examples. However, it should be understood that the present invention is by no means restricted thereto. Physical properties disclosed in Examples were measured by the following methods.

[Composition of Fluorocopolymer]

It was measured by molten fluorine NMR and fluorine content analysis.

[Melting Point (° C.)]

It was obtained from an endothermic peak obtained when a fluorocopolymer was heated to 300° C. at 10° C./min in a dried air atmosphere using a scanning differential thermal analyzer (DSC220CU, manufactured by Seiko Instruments Inc.).

[Volumetric Flow Rate ($mm^3$/sec)]

It is represented by the extrusion rate when a fluorocopolymer is extruded from an orifice with a diameter of 2.1 mm and a length of 8 mm under a load of 7 kg at a temperature of 297° C. by using a Flowtester manufactured by Shimadzu Corporation.

[Haze (%)]

The haze of a film with a thickness of 200 μm obtained by extrusion was measured by using SM-5 manufactured by SUGA TEST INSTRUMENTS in accordance with a method as disclosed in JIS K7105.

[Elmendorf Tear Strength (N)]

A rectangular test specimen as disclosed in JIS K7128-2 was cut out from a film with a thickness of 200 μm obtained by extrusion to obtain a sample. Measurement was carried out by using Elmendorf type Tearing Tester (manufactured by Toyo Seiki Seisaku-sho, Ltd.).

[Tensile Strength (MPa), at Break]

A 5B test specimen as disclosed in JIS K7162 was cut out from a film with a thickness of 200 μm obtained by extrusion to obtain a sample. Both ends of the sample were set to the chuck portion of a tensile tester (manufactured by ORIENTEC Co., Ltd.), and a tensile test was carried out at a rate of 200 mm/min to measure the tensile strength at break.

[Measurement of the Size and the Number of Fisheyes]

Using a film with a thickness of 200 μm obtained by extrusion, a portion corresponding to an area of 0.25 $m^2$ was optionally selected from the surface, and the number of fisheyes in said portion was visually counted. The counted value was multiplied by 4 to calculate the number of fisheyes per $m^2$. The unit is represented by the number per $m^2$. Further, the size of the fisheyes was classified into a size of at least 0.1 $mm^2$, a size of at least 0.05 $mm^2$ and less than 0.1 $mm^2$ and a size of at least 0.03 $mm^2$ and less than 0.05 $mm^2$ in accordance with Dirt Estimation Chart (published by National Printing Bureau) with reference to a sample. In the evaluation of the film of the present invention, fisheyes with sizes of less than 0.05 $mm^2$, which have no influence over the appearance of the film, were not defined.

EXAMPLE 1

A polymerization reactor equipped with a stirrer having an internal volume of 94 liters was deaerated. 70.6 kg of 1-hydrotridecafluorohexane, 20.4 kg of 1,3-dichloro-1,1,2,2,3-pentafluoropropane (manufactured by Asahi Glass Company, Limited, hereinafter referred to as AK225cb), 1.89 kg of PPVE and 2.25 kg of HFP were charged into the polymerization reactor. The temperature in the interior of the polymerization reactor was increased to 66° C., and a mixed gas of TFE/ethylene=76/24 (molar ratio) was injected until the pressure reached 1.5 MPa-G. Into the polymerization reactor, 65 mL of a 1 mass % AK225cb solution of tert-butyl peroxypivalate as a polymerization initiator was charged to initiate the polymerization. A monomer mixed gas of TFE/ethylene=50/50 (molar ratio) was continuously charged so that the pressure would be constant during polymerization. 7.3 Hours after initiation of the polymerization, when 7.1 kg of the monomer mixed gas was charged, the temperature in the interior of the polymerization reactor was decreased to room temperature and at the same time, unreacted monomers were purged until the pressure reached normal pressure.

A slurry of the obtained fluorocopolymer 1 was put into a granulation tank of 200 L into which 75 kg of water was charged. Then, the slurry and water in the granulation tank were heated to 105° C. with stirring. Granulation was carried out in the granulation tank while the solvent was removed by distillation. The obtained granulated product was dried at 150° C. for 5 hours to obtain 7.4 kg of a fluorocopolymer granulated product.

The composition of the fluorocopolymer 1 was such that polymer units based on TFE/polymer units based on ethylene/polymer units based on HFP/polymer units based on PPVE=50.6/48.2/0.7/0.7 (molar ratio). The melting point was 267° C., and the volumetric flow rate was 5.8 $mm^3$/sec.

The fluorocopolymer granulated product 1 was pelletized by a single-screw extruder at 305° C. to obtain pellets 1. Then, the pellets 1 were molded into a film with a thickness of 200 μm by using a single-screw extruder at a molding temperature of 310° C. With respect to the size and the number of fisheyes in the obtained film, the number of fisheyes with sizes of at least 0.05 $mm^2$ and less than 0.1 $mm^2$ was 28 per $m^2$, and the number of fisheyes with sizes of at least 0.1 $mm^2$ was 6 per $m^2$. The haze was 7.6%, the Elmendorf tear strength was 82N, and the tensile strength was 68 MPa.

COMPARATIVE EXAMPLE 1

The fluorocopolymer granulated product 1 was pelletized by a single-screw extruder at a temperature of 330° C. to obtain pellets 2. The pellets 2 were molded into a film with a thickness of 200 μm by using a single-screw extruder at a molding temperature of 330° C. With respect to the size and the number of fisheyes in the obtained film, the number of fisheyes with sizes of from 0.05 $mm^2$ and less than 0.1 $mm^2$ was 237 per $m^2$, and the number of fisheyes with sizes of at least 0.1 $mm^2$ was 38 per $m^2$. The haze was 8.1%, the Elmendorf tear strength was 81N, and the tensile strength was 65 MPa.

The fluorocopolymer film of the present invention is suitable as a film for an agricultural greenhouse and a film for a film structure. Further, since it is excellent in transparency, it can be applicable to a protective film for a solar battery, a release film, a carrier film, etc.

The entire disclosure of Japanese Patent Application No. 2004-191260 filed on Jun. 29, 2004 including specification, claims and summary is incorporated herein by reference in its entirety.

What is claimed is:

1. A method of preparing a fluorocopolymer film, comprising: molding a fluorocopolymer at a molding temperature of at most 320° C. to obtain the fluorocopolymer film, wherein: the fluorocopolymer comprises repeating units based on ethylene, repeating units based on tetrafluoroethylene, repeating units based on hexafluoropropylene and repeating units based on a fluoroalkyl vinyl ether represented by $CF_2=CFOR^f$ (wherein $R^f$ represents a $C_{1-10}$ fluoroalkyl group), a molar ratio of the repeating units based on ethylene to the repeating units based on tetrafluoroethylene in the fluorocopolymer is from 10/90 to 60/40;

a content of the repeating units based on hexafluoropropylene to the total repeating units in the fluorocopolymer is from 0.1 to 20 mol %;

a content of the repeating units based on fluoroalkyl vinyl ether to the total repeating units in the fluorocopolymer is from 0.1 to 10 mol %;

the fluorocopolymer has a volumetric flow rate of from 0.1 to 30 mm$^3$/sec at 297° C. a number of fisheyes contained in the obtained fluorocopolymer film having a size of at least 0.05 mm$^2$ and less than 0.1 mm$^2$ is at most 50 per m$^2$; and a number of fisheyes contained in the obtained fluorocopolymer film having a size of at least 0.1 mm$^2$ is at most 15 per m$^2$.

2. The method according to claim 1, wherein $R^f$ is a perfluoroalkyl group.

3. The method according to claim 1, wherein the fluoroalkyl vinyl ether is $CF_2$=$CFO(CF_2)_3F$.

4. The method according to claim 1, wherein the obtained fluorocopolymer film has an Elmendorf tear strength of at least 70N.

5. The method according to claim 1, wherein the obtained fluorocopolymer film has a haze of at most 15%.

6. The method according to claim 1, wherein the obtained fluorocopolymer film a tensile strength of at least 50 MPa.

7. The method according to claim 2, wherein the obtained fluorocopolymer film has an Elmendorf tear strength of at least 70N.

8. The method according to claim 2, wherein the obtained fluorocopolymer film has a haze of at most 15%.

9. The method according to claim 2, wherein the obtained fluorocopolymer film has a tensile strength of at least 50 MPa.

10. The method according to claim 3, wherein the obtained fluorocopolymer film has an Elmendorf tear strength of at least 70N.

11. The method according to claim 3, wherein the obtained fluorocopolymer film has a haze of at most 15%.

12. The method according to claim 3, wherein the obtained fluorocopolymer film has a tensile strength of at least 50 MPa.

* * * * *